United States Patent
Yang et al.

(10) Patent No.: US 7,579,770 B2
(45) Date of Patent: Aug. 25, 2009

(54) SPARK-GAP WHITE FLUORESCENT LAMP HAVING SILICON QUANTUM DOTS AND PREPARING METHOD THEREOF

(75) Inventors: Tsun-Neng Yang, Taipei (TW); Wei-Yang Ma, Banciao (TW)

(73) Assignee: Atomic Energy Council-Institute of Nuclear Energy Research, Taoyuan (TW)

( * ) Notice: Subject to any disclaimer, the term of this patent is extended or adjusted under 35 U.S.C. 154(b) by 435 days.

(21) Appl. No.: 11/510,825

(22) Filed: Aug. 28, 2006

(65) Prior Publication Data

US 2008/0048554 A1 Feb. 28, 2008

(51) Int. Cl.
*H01J 1/62* (2006.01)
(52) U.S. Cl. .................................. 313/503; 313/486
(58) Field of Classification Search .................. 313/503, 313/509, 485, 486
See application file for complete search history.

(56) References Cited

U.S. PATENT DOCUMENTS

| | | | | |
|---|---|---|---|---|
| 6,544,870 B2 * | 4/2003 | Park et al. | ..................... | 438/507 |
| 6,946,803 B2 * | 9/2005 | Moore | ..................... | 315/169.4 |
| 7,141,931 B2 * | 11/2006 | Park et al. | ..................... | 313/607 |
| 2004/0245912 A1 * | 12/2004 | Thurk et al. | ................. | 313/484 |
| 2005/0179363 A1 * | 8/2005 | Choi et al. | ................... | 313/497 |

* cited by examiner

*Primary Examiner*—Karabi Guharay
*Assistant Examiner*—Andrew J Coughlin
(74) *Attorney, Agent, or Firm*—Troxell Law Office, PLLC

(57) ABSTRACT

A white fluorescent lamp is prepared with a substrate and a high voltage circuit. The substrate has a fluorescent layer with silicon quantum dots. The lamp generates a white light by exciting the substrate with the circuit through a spark gap. A photoelectronic conversion is improved and a cost is lowered by using a cheap material as silicon.

7 Claims, 4 Drawing Sheets

SPARK-GAP WHITE FLUORESCENT LAMP HAVING SILICON QUANTUM DOTS AND PREPARING METHOD THEREOF

FIELD OF THE INVENTION

The present invention relates to a white fluorescent lamp; more particularly, relates to exciting a substrate having a fluorescent layer with silicon quantum dots (Si-QD) for producing a white light through a spark gap.

DESCRIPTION OF THE RELATED ARTS

A first prior art called "A white light emitting diode," is proclaimed in Taiwan, comprising a light emitting source, emitting a light having a wavelength between 440 nanometers (nm) to 490 nm; and a phosphor, comprising a yellow phosphor and a red phosphor, where the yellow phosphor is made of $(Me_{1-x-y}Eu_xRe_y)_3SiO_5$; and the red phosphor is made of $Y_2O_3:Eu^{3+}$, $Y_2O_3:Bi^{3+}$, $(Y,Gd)_2O_3:Eu^{3+}$, $(Y,Gd)_2O_3:Bi^{3+}$, $Y_2O_2S:Bi^{3+}$, $(Me_{1-x}Eu_x)ReS$ or $Mg_3SiO_4:Mn$.

A second prior art, "A white-light emitting device and a fabricating method thereof," is revealed in Taiwan, comprising a light emitting diode (LED), a first phosphor and a second phosphor, where the LED emits an ultra-violet light; the first phosphor is excited by the ultra-violet light from the LED to generate a cyan fluorescent light having a wave length between 470 nm and 500 nm; the first phosphor is made of $(Ba_{1-x-y}Eu_xSr_y)MgAl_{10}O_{17}$ with x greater than 0 and not greater than 1 and y not smaller than 0 and not greater than 1; the second phosphor is excited by the ultra-violet light from the LED to generate an orange light having a wavelength between 570 nm and 600 nm; the second phosphor is made of $(Ca,Eu,Mn)(PO_4)_3Cl$; and a white light is obtained by mixing the cyan light and the orange light.

A third prior art is called "A white light emitting device", comprising a LED, a first phosphor and a second phosphor, where the LED emits blue light or cyan light; the first phosphor is made of $(Y_xM_yCe_z)Al_5O_{12}$; x plus y equals 3 and x and y not equals to 0; z is smaller than 0.5 and greater than 0; M is Tb, Lu or Yb; Ce is a luminescent center; the first phosphor is excited by the light from the LED to obtain a yellow light having a wave length between 520 nm and 580 nm; the second phosphor is excited by the light from the LED to obtain a red light having a wavelength between 580 nm and 640 nm; and a white light is obtained by mixing the light from the LED with the yellow light and the red light.

Although the above prior arts generate white lights by exciting phosphors with lights, the photoelectronic transformation efficiency is low so that exciting light sources using high power, or thick phosphor layer, are used. Hence, the prior arts do not fulfill users' requests on actual use.

SUMMARY OF THE INVENTION

The main purpose of the present invention is to prepare a spark-gap Si-QDs white fluorescent lamp where, with a spark gap, electron and ultra-violet sources are produced to excite a substrate having a Si-QDs fluorescent layer and so a white light is obtained with improved photoelectronic conversion.

To achieve the above purpose, the present invention is a spark-gap white fluorescent lamp having silicon quantum dots and a preparing method thereof. Therein, a Si-QDs white fluorescent lamp comprises a spark gap unit and a high voltage circuit. The spark gap unit is a hexahedron with each surface made of a substrate having a Si-QDs fluorescent layer; and two corresponding surfaces are selected to be an anode and a cathode of spark gap electrodes. Or, the spark gap unit comprises a substrate having a Si-QDs fluorescent layer, and a sheet metal; and, the substrate and the sheet metal are respectively an anode and a cathode of spark gap electrodes. The high voltage circuit has a high voltage source whose anode terminal and cathode terminal are respectively connected with the anode and the cathode of spark gap electrodes. The spark-gap Si-QDs white fluorescent lamp has a preparing method comprising steps of: (a) forming substrates each having a Si-QDs fluorescent layer; (b) forming a hexahedron spark gap unit with the substrates; (c) selecting two surfaces of the spark gap unit to be an anode and a cathode of spark-gap electrodes; and (d) forming a high voltage circuit with a high voltage source. Accordingly, a novel spark-gap white fluorescent lamp having silicon quantum dots and a preparing method thereof are obtained.

BRIEF DESCRIPTIONS OF THE DRAWINGS

The present invention will be better understood from the following detailed descriptions of the preferred embodiments according to the present invention, taken in conjunction with the accompanying drawings, in which FIG. 1 is a view showing the state of use of the first preferred embodiment according to the present invention;

DESCRIPTION OF THE PREFERRED EMBODIMENTS

The following descriptions of the preferred embodiments are provided to understand the features and the structures of the present invention.

Figure 1:
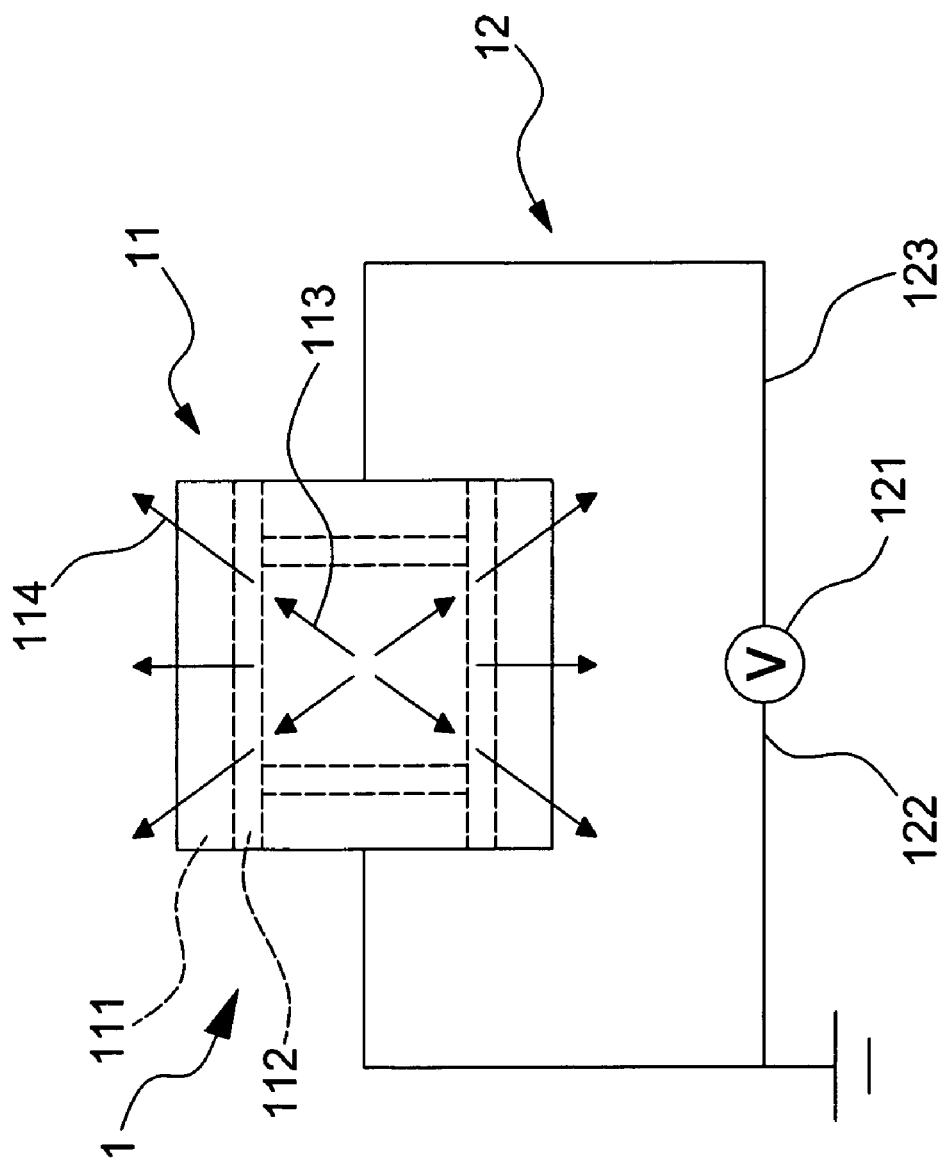

Please refer to FIG. 1, which is a view showing the state of use of a first preferred embodiment according to the present invention. As shown in the figure, the present invention is a spark-gap white fluorescent lamp having silicon quantum dots (Si-QD) and a preparing method thereof, where the spark-gap Si-QDs white fluorescent lamp 1 of the first preferred embodiment comprises a spark gap unit 11 and a high voltage circuit 12.

The spark gap unit 11 is a hexahedron with each surface made of a substrate 111 having a Si-QDs fluorescent layer 112; and, two corresponding substrates 111 are selected to be an anode and a cathode of spark gap electrodes. Therein, the Si-QDs fluorescent layer 112 is made of a material formed through a physical or chemical method by embedding Si-QDs having a diameter between 1 nanometer (nm) and 10 nm into an organic fluorescent material or a non-organic fluorescent material (such as silicon oxide, silicon nitride or silicon carbide); the Si-QDs fluorescent layer 112 is covered on the substrate 111 through a chemical vapor deposition (CVD) or a screen printing; and, the substrate 111 is made of a material having a transparency greater then 90 percents (%), such as a glass.

The high voltage circuit 12 has a high voltage source 121, whose anode terminal 122 and cathode terminal 123 are respectively connected with the anode and the cathode of spark gap electrodes.

When a current is entered into the high voltage circuit 12 to raise a voltage of the high voltage source 121 to a certain level, an insulation avalanche of a spark gas is obtained and ionized electrons are passed through a space to produce electron and ultraviolet sources 113 so that the substrates 111 each having a Si-QDs fluorescent layer 112 is excited to produce a white light 114.

Figure 2:
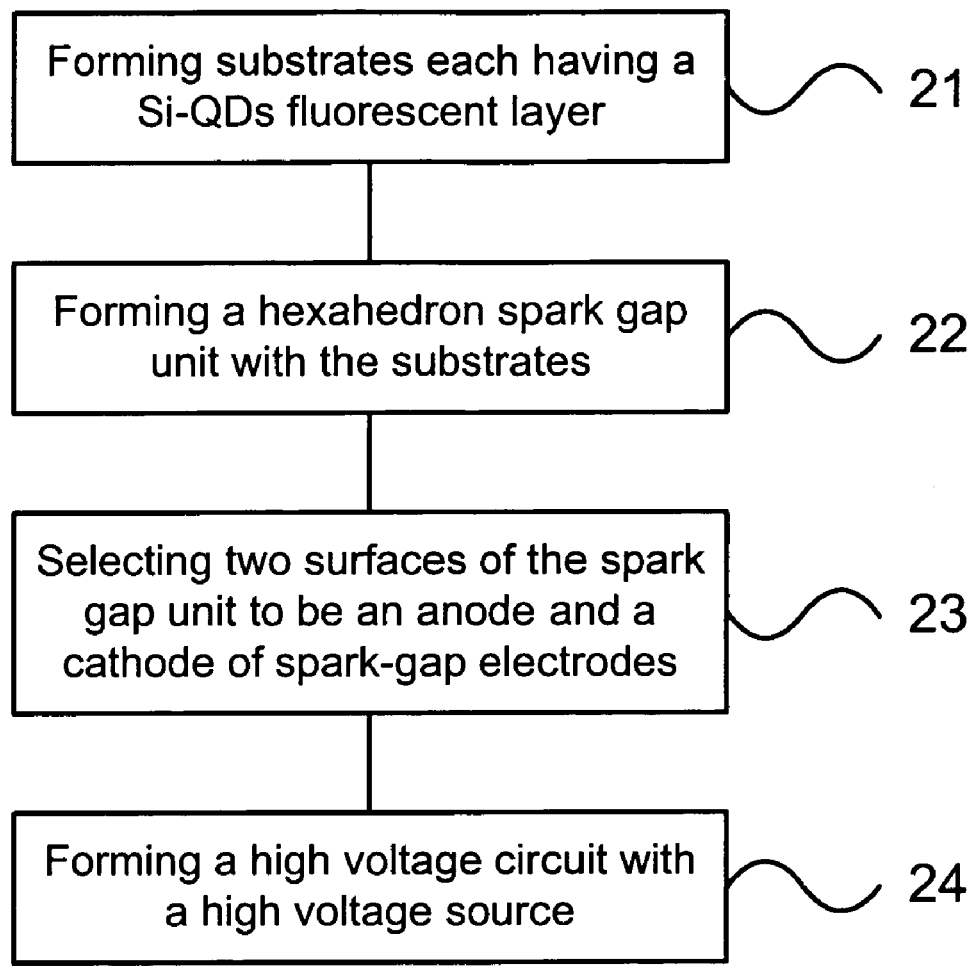
FIG. 2 is a flow view showing the preparing method of the first preferred embodiment.

Please refer to FIG. 2, which is a flow view showing a preparing method of the first preferred embodiment. As shown in the figure, a spark-gap Si-QDs white fluorescent lamp of the first preferred embodiment has a preparing method comprising the following steps:

(a) Forming substrates each having a Si-QDs fluorescent layer 21: Through a physical or chemical method, Si-QDs having a diameter between 1 nm and 10 nm are embedded into an organic fluorescent material or a non-organic fluorescent material, such as silicon oxide, silicon nitride or silicon carbide. Then a Si-QDs fluorescent layer is covered on a substrate through a CVD or a screen printing by using the material so that a substrate having a Si-QDs fluorescent layer is formed while the substrate is made of a material having a transparency more than 90%, such as a glass.

(b) Forming a hexahedron spark gap unit with the substrates 22: A spark gap unit is formed with the substrates. The spark gap unit is a hexahedron, where each surface of the hexahedron is made of the substrate having the Si-QDs fluorescent layer.

(c) Selecting two surfaces of the spark gap unit to be an anode and a cathode of spark-gap electrodes 23: Among the surfaces of the spark gap unit, two corresponding surfaces of the spark gap unit are selected to be an anode of a spark-gap electrode and a cathode of the spark-gap electrode separately.

(d) Forming a high voltage circuit with a high voltage source 24: A high voltage source has an anode terminal and a cathode terminal separately connected to the spark-gap electrodes of the spark gap unit, the two corresponding substrates, to form a high voltage circuit.

Through the above steps, a spark-gap Si-QDs white fluorescent lamp is prepared.

Figure 3:
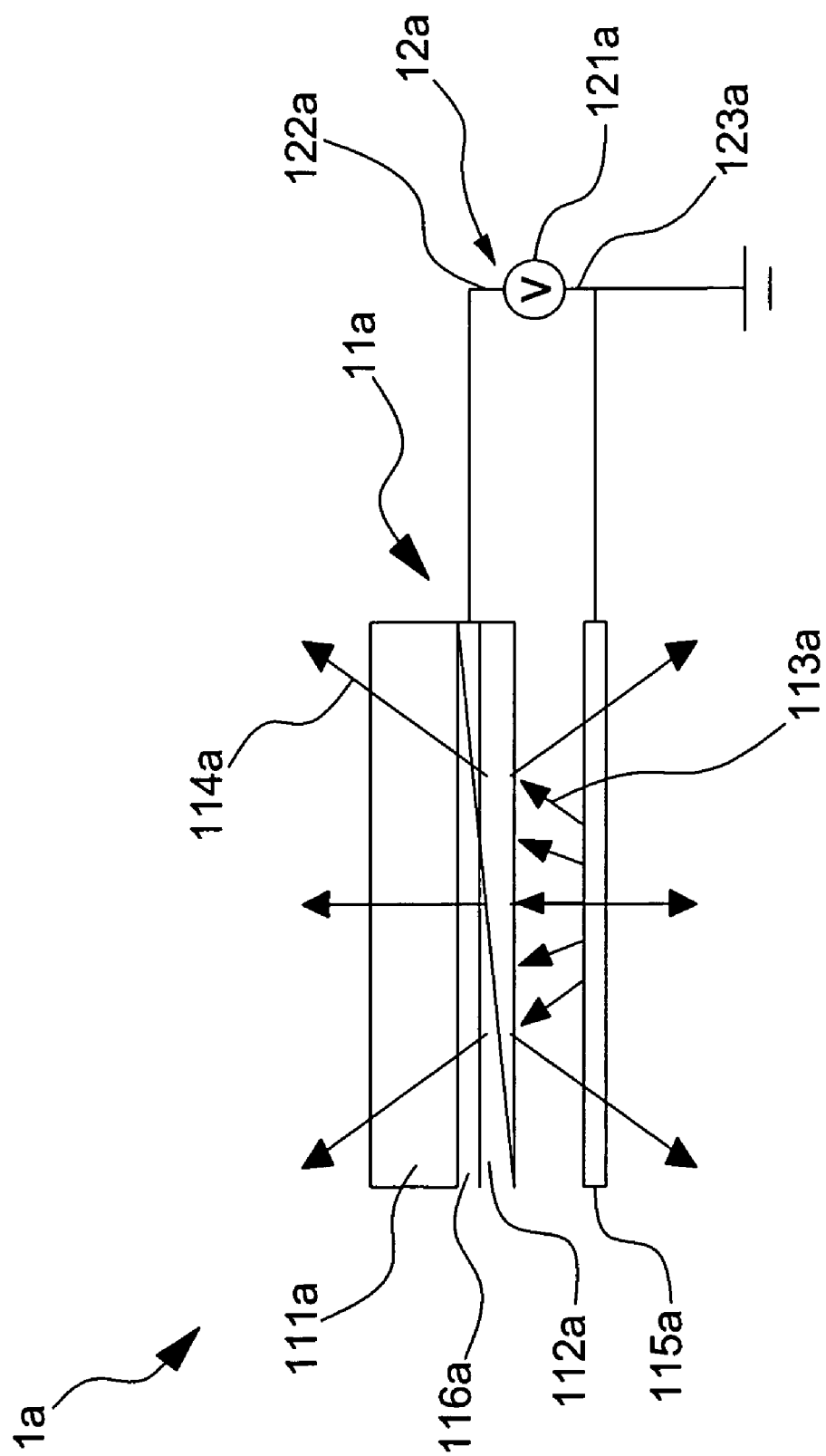
FIG. 3 is a view showing the state of use of the second preferred embodiment.

Please refer to FIG. 3, which is a view showing the state of use of a second preferred embodiment. As shown in the figure, the present invention is a spark-gap white fluorescent lamp having Si-QDs and a preparing method thereof, where the spark-gap Si-QDs white fluorescent lamp 1a of the second preferred embodiment comprises a spark gap unit 11a and a high voltage circuit 12a.

The spark gap unit 11a has a substrate 111a with a Si-QDs fluorescent layer 112a and has a sheet metal 115a (or a metal wire), where the substrate 111a and the sheet metal 115a are respectively an anode and a cathode of spark gap electrodes. Therein, the Si-QDs fluorescent layer 112a is made of a material formed through a physical or chemical method by embedding Si-QDs having a diameter between 1 nm and 10 nm into an organic fluorescent material or a non-organic fluorescent material (such as silicon oxide, silicon nitride or silicon carbide); the Si-QDs fluorescent layer 112a is covered on the substrate 111a through a CVD or a screen printing; an indium tin oxide (ITO) layer 116a is further added between the substrate 111a and the Si-QDs fluorescent layer 112a; and, the substrate 111a is made of a material having a transparency greater then 90%, such as a glass.

The high voltage circuit 12a has a high voltage source 121a whose anode terminal 122a and cathode terminal 123a are respectively connected with the anode and the cathode of spark gap electrodes. That is to say, the anode terminal 122a is connected with the substrate 111a having the Si-QDs fluorescent layer 112a; and, the cathode terminal 123a is connected with the sheet metal 115a.

When a current is entered into the high voltage circuit 12a to raise a voltage of the high voltage source 121a to a certain level, an insulation avalanche of a spark gas is obtained and ionized electrons are passed through a space to produce electron and ultraviolet sources 113a so that the substrates 111a each having a Si-QDs fluorescent layer 112a is excited to produce a white light 114a.

Figure 4:
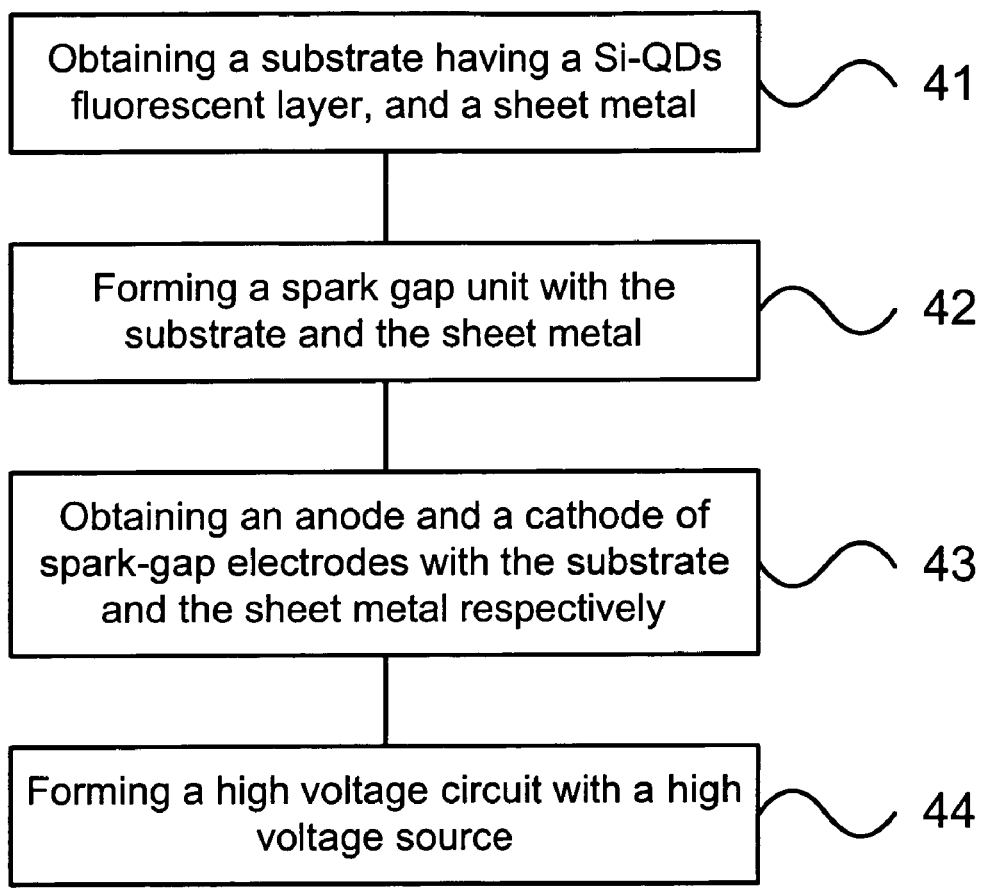
FIG. 4 is a flow view showing the preparing method of the second preferred embodiment.

Please refer to FIG. 4, which is a flow view showing a preparing method of the second preferred embodiment. As shown in the figure, a spark-gap Si-QDs white fluorescent lamp of the second preferred embodiment has a preparing method comprising the following steps:

(a1) Obtaining a substrate having a Si-QDs fluorescent layer, and a sheet metal 41: Through a physical or chemical method, Si-QDs having a diameter between 1 nm and 10 nm are embedded into an organic fluorescent material or a non-organic fluorescent material, such as silicon oxide, silicon nitride or silicon carbide. Then the Si-QDs fluorescent layer is covered on a substrate through a CVD or a screen printing by using the material so that a substrate having a Si-QDs fluorescent layer is formed while the substrate is made of a material having a transparency more than 90%, such as a glass. And an ITO layer is further added between the substrate and the Si-QDs fluorescent layer.

(b1) Forming a spark gap unit with the substrate and the sheet metal 42.

(c1) Obtaining an anode and a cathode of spark-gap electrodes with the substrate and the sheet metal respectively 43.

(d1) Forming a high voltage circuit with a high voltage source 44: A high voltage source has an anode terminal and a cathode terminal separately connected to the spark-gap electrodes of the spark gap unit, the substrate and the sheet metal, to form a high voltage circuit.

Through the above steps, a spark-gap Si-QDs white fluorescent lamp is prepared.

To sum up, the present invention is a spark-gap white fluorescent lamp having silicon quantum dots and a preparing method thereof, where a spark-gap Si-QDs white fluorescent lamp is prepared; and, with a spark gap, electron and ultraviolet sources are produced to excite a substrate having a Si-QDs fluorescent layer so that a white light is obtained with an improved photoelectronic conversion and with a low cost by using a cheap material of silicon.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A spark-gap white fluorescent lamp having silicon quantum dots (Si-QD), comprising:

a spark gap unit, said spark gap unit being a hexahedron, each surface of said spark gap unit being a substrate having a Si-QDs fluorescent layer configured to produce a white light, two of said surfaces of said spark gap unit being selected to be an anode of a spark-gap electrode and a cathode of said spark-gap electrode separately; and a voltage circuit, said voltage circuit comprising a voltage source, said voltage source comprising an anode terminal connecting to said anode of said spark-gap electrode, and a cathode terminal connecting to said cathode of said spark-gap electrode.

2. The lamp according to claim 1, wherein said Si-QDs fluorescent layer is made of a first material obtained by embedding Si-QDs having a diameter between 1 nanometer (nm) and 10 nm into a second material through a method, said second material being selected from a group consisting of an organic fluorescent material and a non-organic fluorescent material, said method being selected from a group consisting of a physical method and a chemical method.

3. The lamp according to claim 2, wherein said non-organic fluorescent material is selected from a group consisting of silicon oxide, silicon nitride and silicon carbide.

4. The lamp according to claim 1, wherein said Si-QDs fluorescent layer is deposed on said substrate through a method selected from a group consisting of a chemical vapor deposition (CVD) and a screen printing.

5. The lamp according to claim 1, wherein said substrate is made of a material having an optical transparency greater then 90 percent (%).

6. The lamp according to claim 5, wherein said material is a glass.

7. The lamp according to claim 1, wherein said Si-QDs white fluorescent lamp has a preparing method, said preparing method comprising steps of:
  (a) obtaining a plurality of substrates, said substrates having a Si-QDs fluorescent layer;
  (b) obtaining a hexahedron spark gap unit with each surface of said spark gap being made of at least one of said substrates;
  (c) selecting two corresponding surfaces of said spark gap unit to be an anode of a spark-gap electrode and a cathode of said spark-gap electrode, respectively; and
  (d) obtaining a voltage circuit with a voltage source connecting to said spark gap unit.

* * * * *